United States Patent
Hattori et al.

(10) Patent No.: US 8,426,508 B2
(45) Date of Patent: Apr. 23, 2013

(54) STUDLESS TIRE

(75) Inventors: Takayuki Hattori, Kobe (JP); Ryoji Kojima, Kobe (JP); Naohiko Kikuchi, Kobe (JP); Yasuhisa Minagawa, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 440 days.

(21) Appl. No.: 12/484,505

(22) Filed: Jun. 15, 2009

(65) Prior Publication Data

US 2010/0056667 A1    Mar. 4, 2010

(30) Foreign Application Priority Data

Sep. 1, 2008    (JP) .................................. 2008-224044

(51) Int. Cl.
*C08K 5/09*    (2006.01)
*C08J 5/14*    (2006.01)

(52) U.S. Cl.
USPC ......................................... 524/322; 523/157

(58) Field of Classification Search .................... 524/322
See application file for complete search history.

(56) References Cited

U.S. PATENT DOCUMENTS

| 7,122,090 B2 * | 10/2006 | Tsumori et al. ............ 156/128.6 |
| 2004/0211111 A1 | 10/2004 | Kikuchi |
| 2007/0082999 A1 * | 4/2007 | Otsuki .......................... 524/495 |
| 2010/0168312 A1 * | 7/2010 | Ishida et al. .................. 524/495 |

FOREIGN PATENT DOCUMENTS

| EP | 1 961 785 A1 | 8/2008 |
| JP | 9-77915 A | 3/1997 |
| JP | 2003-213039 A | 7/2003 |
| JP | 2006063094 A * | 3/2006 |
| JP | 2007-106799 A | 4/2007 |
| JP | 2007-176417 A | 7/2007 |
| JP | 2007-204735 A | 8/2007 |
| JP | 2007-321041 A | 12/2007 |

OTHER PUBLICATIONS

Translation of JP 2006063094, Mar. 2008.*
Office Action for corresponding Japanese Application No. 2008-224044 dated May 10, 2011.

* cited by examiner

*Primary Examiner* — Hui Chin
(74) *Attorney, Agent, or Firm* — Birch, Stewart, Kolasch & Birch, LLP

(57) ABSTRACT

The present invention has its object to provide a high performance studless tire, which has both good braking force and high handling stability on ice or snow, at higher productivity and at a lower price for customers. The studless tire comprises a tread made of a rubber composition containing 2.2 to 10 parts by mass of a fatty acid and/or a derivative of the fatty acid per 100 parts by mass of a rubber component, the tread having a JIS-A hardness of 50 or less.

8 Claims, No Drawings

STUDLESS TIRE

TECHNICAL FIELD

The present invention relates to a studless tire (a winter tire).

BACKGROUND ART

Use of spike tires has been banned by law in Japan so as to prevent powder dust pollution resulting from the spike tires, and thus studless tires are now used instead of the spike tires in cold regions. In order to improve grip performance of the studless tires on ice or snow, there is a method that decreases an elastic modulus at low temperatures and improves traction. Particularly, the braking force on ice is largely affected by an effective-contact area between rubber and ice. In order to enlarge the effective-contact area, a rubber has been desired which is flexible at low temperatures.

On the other hand, where the hardness of rubber alone is decreased using a method that comprises, for example, increasing the amount of oil, there is a problem that the handling stability on ice or snow decreases.

Generally, a natural rubber or a butadiene rubber is often used as a main ingredient in a tread rubber of a studless tire not only for trucks, buses and light trucks but also for passenger vehicles (for example, see JP 2007-176417 A). This is because these rubbers have a low glass transition temperature and flexibility even though they have high strength. However, reversion occurs when the natural rubber or butadiene rubber is sulfur-vulcanized. In this phenomenon, rubber degrades or its cross-linked state deteriorates, so that the elastic modulus at low temperatures also decreases. However, the inventors of the present invention have found from their studies that the hardness also excessively decreases and thus the handling stability decreases. In addition, the reversion may decrease the abrasion resistance and increase tan δ at high temperatures excessively, thereby decreasing fuel economy.

For some tires including studless tires, vulcanization is performed at higher temperatures in order to increase the productivity of tires. In this case, the above phenomenon, particularly, is more pronounced. Accordingly, there is an additional problem of decrease in abrasion resistance and fuel economy caused by the reversion.

SUMMARY OF THE INVENTION

An object of the present invention is to solve the above problems and provide a high performance studless tire which contributes to both good braking force and high handling stability on ice or snow. Further, another object of the present invention is to provide the studless tire at higher productivity and at a lower price for customers.

The present invention relates to a studless tire comprising a tread made of a rubber composition that contains 2.2 to 10 parts by mass of a fatty acid and/or a derivative of the fatty acid per 100 parts by mass of a rubber component, the tread having a JIS-A hardness of 50 or less.

It is desirable that the rubber composition further contains a carbon black with an average particle size of 22 nm or less and/or a DBP oil absorption of 120 ml or more per 100 g.

It is desirable that the rubber component comprises a butadiene rubber in which syndiotactic-1,2-polybutadiene is dispersed.

It is desirable that the rubber component comprises a butadiene rubber that has a cis content of 95% or more and has a viscosity of a 5% solution in toluene of 80 cps or more at 25° C.

It is desirable that the rubber composition further contains 1 to 10 parts by mass of calcium carbonate per 100 parts by mass of the rubber component.

BEST MODE FOR CARRYING OUT THE INVENTION

The studless tire of the present invention has a tread made of a rubber composition that contains 2.2 to 10 parts by mass of a fatty acid and/or a derivative of the fatty acid per 100 parts by mass of a rubber component, the tread having a JIS-A hardness of 50 or less.

The rubber component is not particularly limited and examples of the rubber component include natural rubbers (NR), epoxidized natural rubbers (ENR), butadiene rubbers (BR), styrene-butadiene rubbers (SBR), isoprene rubbers (IR), ethylene propylene diene rubbers (EPDM), chloroprene rubbers (CR), acrylonitrile butadiene rubbers (NBR), butyl rubbers (IIR), and halogenated butyl rubbers (X-IIR). It is particularly desirable that the NR and/or the ENR be contained because it is possible to be environment friendly, to prepare for a future decrease in oil supply, and to improve the abrasion resistance. Further, the NR has a low glass transition temperature and flexibility, and thus contributes to good performance on ice.

The rubber component may comprise at least one functional group (hereinafter referred to as the functional group) selected from the group consisting of alkoxy, alkoxysilyl, epoxy, glycidyl, carbonyl, ester, hydroxy, amino, and silanol. Commercially available rubber or its appropriately modified rubber may be used as a rubber comprising the functional group.

It is desirable that the rubber composition contains a butadiene rubber. Blending the butadiene rubber improves the braking performance of the studless tires on ice and the handling stability of the studless tires on ice and snow. Further, suppressing the reversion by using the technique of the present invention increases the abrasion resistance. The lower limit of the butadiene rubber content in 100% by mass of the rubber component is desirably 20% by mass, more desirably 30% by mass, even more desirably 35% by mass, and most desirably 50% by mass. On the other hand, the upper limit thereof in 100% by mass of the rubber component is desirably 80% by mass, more desirably 70% by mass, even more desirably 65% by mass, and most desirably 60% by mass. If the butadiene rubber content is less than 20% by mass, the glass transition temperature tends not to decrease and the braking force on ice and snow may decrease. If the butadiene rubber content exceeds 80% by mass, good performance on ice and snow may be achieved, but the mechanical strength and the abrasion resistance tend to decrease. According to the present invention, it is possible to increase a butadiene rubber content so as to contribute to both abrasion resistance and performance on ice and snow.

As the above butadiene rubber, a butadiene rubber may be blended which has a cis content of 95% or more and has a viscosity of a 5% solution in toluene of 80 cps or more at 25° C. Blending such a butadiene rubber can improve the processability and the abrasion resistance. The above viscosity is desirably 200 cps or less. The butadiene rubber with the viscosity exceeding 200 cps may be too viscous, thereby tending to decrease the processability and not to be easily mixed with other rubbers. The lower limit of the viscosity is desirably 110 cps and the upper limit thereof is desirably 150 cps.

It is possible to improve the viscosity and the abrasion resistance if a butadiene rubber having a molecular weight distribution (Mw/Mn) of 3.0 or less is used. Further, a butadiene rubber with a Mw/Mn of 3.0 to 3.4 may be used. Use of such a butadiene rubber can improve both processability and abrasion resistance.

In the case of using the butadiene rubber mixed with a natural rubber and/or a polyisoprene rubber, the total amount of these rubbers in the rubber component is desirably 70% by mass or more. With the amount of 70% by mass or more, it is possible to achieve both good performance on ice and snow and good abrasion resistance, and thereby increase the reversion resistance. The amount of these rubbers is more desirably 80% by mass or more, even more desirably 90% by mass or more, and most desirably 100% by mass.

The rubber composition may contain a butadiene rubber in which syndiotactic-1,2-polybutadiene (hereinafter also referred to as "SPB") is dispersed (hereinafter also referred to as "SPB-containing BR"). Blending this ingredient can improve the viscosity, and thereby improve the processability and the abrasion resistance.

The SPB-containing BR comprises the syndiotactic-1,2-polybutadiene as sufficiently fine-dispersed in the matrix BR. The average primary particle size of SPB in the BR is thus very small.

The SPB content in the SPB-containing BR is desirably 8% by mass or more, and more desirably 10% by mass or more. If the content is less than 8% by mass, the viscosity and the abrasion resistance tend not to be sufficiently improved. The content is desirably 20% by mass or less, and more desirably 16% by mass or less. If the content exceeds 20% by mass, the hardness may be too high, and thereby the performance on ice tends to decrease. The content of SPB in the SPB-containing BR is shown by the amount of insoluble matters in boiling n-hexane.

The SPB in the SPB-containing BR is desirably in the form of microcrystals that have an average primary particle size of desirably 500 nm or less, and more desirably 300 nm or less.

Examples of the SPB-containing BR may include VCR 412 and VCR 617 which are produced by Ube Industries, Ltd.

In the above rubber composition, the content of the SPB-containing BR in the rubber component is desirably 2% by mass or more, and more desirably 4% by mass or more. If the content is less than 2% by mass, the viscosity and the abrasion resistance tend not to be sufficiently improved. Further, the content is desirably 40% by mass or less, and more desirably 20% by mass or less. If the content exceeds 40% by mass, the hardness may be too high and thereby the performance on ice may possibly decrease.

The fatty acid and/or the derivative of the fatty acid is not particularly limited. Examples of the fatty acid may include aliphatic carboxylic acids derived from vegetable oils such as coconut oil, palm kernel oil, camellia oil, olive oil, almond oil, canola oil, peanut oil, rice bran oil, cacao butter, palm oil, soybean oil, cottonseed oil, sesame oil, linseed oil, castor oil and rapeseed oil; aliphatic carboxylic acids derived from animal oils such as beef tallow; aliphatic carboxylic acids chemically synthesized from petroleum or the like; stearic acid; palmitic acid; myristic acid; lauric acid; caprylic acid; oleic acid; and linoleic acid. Examples of the derivative may include metal salts such as zinc salt, calcium salt and magnesium salt. Also, commercially available processing aids containing these fatty acids can be suitably used. Above all, a fatty acid such as stearic acid, particularly stearic acid, is desirably used due to the low cost.

The number of carbon atoms in the fatty acid and/or the derivative thereof is desirably 4 or more, and more desirably 6 or more. If the number of carbon atoms is less than 4, the dispersibility tends to decrease. The number of carbon atoms in the fatty acid and/or the derivative thereof is desirably 18 or less, more desirably 14 or less, and even more desirably 12 or less. If the number of carbon atoms exceeds 18, the reversion tends not to be suppressed.

Here, an aliphatic group in the fatty acid and/or the derivative thereof may be one having a chain structure such as an alkyl group or one having a ring structure such as a cycloalkyl group.

The content of the fatty acid and/or the derivative thereof per 100 parts by mass of the rubber component is 2.2 parts by mass or more, desirably 2.4 parts by mass or more, even more desirably 2.8 parts by mass or more, and most desirably 3.5 parts by mass or more. If the content is less than 2.2 parts by mass, sufficient reversion resistance may not be ensured and thereby it may be difficult to improve the handling stability and the like. The above content is 10 parts by mass or less, desirably 7 parts by mass or less, and even more desirably 5 parts by mass or less. If the content exceeds 10 parts by mass, the processability tends to decrease due to an excessive decrease in viscosity, and the fatty acid and/or the derivative thereof tends to bloom.

The above rubber composition desirably contains a carbon black with an average particle size of 22 nm or less and/or a DBP oil absorption of 120 ml or more per 100 g. This makes it possible to increase the viscosity of unvulcanized rubber and thus to improve the processability. If the viscosity is too low, the unvulcanized rubber may be difficult to handle, and furthermore the molded materials tend to stick to each other due to hyperviscosity, and the moldability and the workability tend to decrease.

The content of a carbon black with an average particle size of 22 nm or less and/or a DBP oil absorption of 120 ml or more per 100 g, per 100 parts by mass of the rubber component, is desirably 0.5 parts by mass or more, more desirably 1 part by mass or more, and even more desirably 2 parts by mass or more. If the content is less than 0.5 parts by mass, the processability and the abrasion resistance tend not to be sufficiently improved. The above content is desirably 25 parts by mass or less, more desirably 15 parts by mass or less, and even more desirably 10 parts by mass or less. If the content of the carbon black exceeds 25 parts by mass, the hardness and the cost tend to excessively increase; and if the hardness increases, good braking performance on ice and snow may be difficult to achieve.

In addition, the total content of carbon blacks including the above carbon black is desirably 5 parts by mass or more and 120 parts by mass or less, more desirably 15 parts by mass or more and 80 parts by mass or less, and even more desirably 25 parts by mass or more and 55 parts by mass or less. If the content is less than 5 parts by mass, the reinforcement may be insufficient and thus required block rigidity, handling stability, partial-abrasion resistance and abrasion resistance may not be achieved. Further, the content exceeding 120 parts by mass may decrease the processability and the rolling resistance, and excessively increase the hardness.

The above rubber composition may contain calcium carbonate. This also makes it possible to improve the viscosity and the processability. The calcium carbonate is not particularly limited and a calcium carbonate generally applied to tires can be used.

The content of the calcium carbonate per 100 parts by mass of the rubber component is desirably 1 part by mass or more, more desirably 2 parts by mass or more, and even more desirably 4 parts by mass or more. Further, the content is desirably 10 parts by mass or less, more desirably 8 parts by mass or less, and even more desirably 6 parts by mass or less. If the content is less than 1 part by mass, the viscosity and the processability tend not to be improved. If the content exceeds 10 parts by mass, the abrasion resistance may possibly decrease.

The above rubber composition desirably contains an oil or a plasticizer. This makes it possible to adjust the hardness suitably low and achieve good braking performance on ice. Examples of the oil may include paraffinic process oils, aromatic process oils, and naphthenic process oils. Particularly, the paraffinic process oils are preferably used because the low-temperature properties can be improved and excellent performance on ice can be achieved. Specific examples of the paraffinic process oils may include PW-32, PW-90, PW-150 and PS-32 which are produced by Idemitsu Kosan Co., Ltd. Further, specific examples of the aromatic process oils may include AC-12, AC-460, AH-16, AH-24 and AH-58 which are produced by Idemitsu Kosan Co., Ltd.

If the rubber composition contains the oil or the plasticizer, the amount of this component per 100 parts by mass of the rubber component is desirably 5 parts by mass or more, more desirably 10 parts by mass or more, and even more desirably 15 parts by mass or more. If the amount is less than 5 parts by mass, it may be difficult to sufficiently improve the performance on ice. Meanwhile, the amount thereof per 100 parts by mass of the rubber component is desirably 60 parts by mass or less, more desirably 40 parts by mass or less, and even more desirably 30 parts by mass or less. If this component is contained too much, the abrasion resistance may decrease and the reversion resistance may also decrease. Further, even in the case of an aromatic oil or an alternative aromatic oil which leads to a comparatively small decrease in abrasion resistance, the performance on ice and snow may decrease due to a deterioration in low-temperature properties and the rolling resistance may get worse due to an increase in tan δ at high temperatures.

The rubber composition may contain a compounding ingredient conventionally used in the rubber industries, in addition to the rubber component, the fatty acid and/or the derivative thereof, the oil and the plasticizer. Examples of the compounding ingredient may include reinforcing agents such as carbons and silica; fillers such as eggshell powder; antioxidants; antiozonants; antiaging agents; vulcanization acceleration aids; zinc oxide; vulcanizing agents such as sulfur; peroxides; and vulcanization accelerators.

A tread obtained by using the above rubber composition has a JIS-A hardness of 50 degrees or less, desirably 48 degrees or less, and even more desirably 46 degrees or less. This can lead to better flexibility and thus better performance on ice and snow. Meanwhile, the above hardness is desirably 40 degrees or more, more desirably 43 degrees or more, and even more desirably 45 degrees or more. The tread having the hardness less than 40 degrees tends to have a difficulty in maintaining the processability and ensuring the handling stability.

Cars to which the present invention can be applied are not particularly limited, and examples of the cars include trucks, buses, light trucks, and passenger vehicles. Particularly, the present invention may be desirably applied to passenger vehicles which require higher performance on ice and higher handling stability so that greater effects can be achieved.

With use of the above rubber composition, a studless tire can be produced by a usual method. That is, the studless tire can be produced by preparing a tire tread with use of the rubber composition, laminating the tread with other components, and heating it on a tire molding machine under pressure.

EXAMPLES

Although the present invention is more specifically described based on Examples, the present invention is not limited to these Examples.

In the following, respective chemical agents used in Examples and Comparative Examples are listed.

Natural rubber (NR): RSS #3

BR 1: BR 150B produced by Ube Industries, Ltd. (cis-1,4 bond content: 97%, $ML_{1+4}$ (100° C.): 40, viscosity of a 5% solution in toluene at 25° C.: 48 cps, Mw/Mn: 3.3)

BR 2: VCR 412 produced by Ube Industries, Ltd. (alloy (SPB-containing BR) in which 12% by mass of high crystalline (average primary particle size of crystals being 250 nm) SPB was added and dispersed in high-cis BR with 98% of cis-1, 4 bond content, $ML_{1+4}$ (100° C.): 45)

BR 3: VCR 617 produced by Ube Industries, Ltd. (alloy (SPB-containing BR) in which 17% by mass of high crystalline SPB was added and dispersed in high-cis BR with 98% of cis-1,4 bond content), $ML_{1+4}$ (100° C.): 62)

BR 4: BR 360L produced by Ube Industries, Ltd. (cis-1,4 bond content: 98%, $ML_{1+4}$ (100° C.): 51, viscosity of a 5% solution in toluene at 25° C.: 124 cps, Mw/Mn: 2.4)

Carbon black 1: DIABLACK I produced by Mitsubishi Chemical Corporation (ISAF carbon, average particle size: 23 nm, DBP oil absorption: 114 ml/100 g)

Carbon black 2: DIABLACK SA produced by Mitsubishi Chemical Corporation (SAF-HS carbon, average particle size: 19 nm, DBP oil absorption: 165 ml/100 g)

Carbon black 3: DIABLACK N234 produced by Mitsubishi Chemical Corporation (ISAF-HS carbon, average particle size: 22 nm, DBP oil absorption: 124 ml/100 g)

Calcium carbonate: Precipitated calcium carbonate produced by Maruo Calcium Co., Ltd.

Mineral oil: PS-32 (paraffinic process oil) produced by Idemitsu Kosan Co., Ltd.

Stearic acid: KIRI produced by NOF Corporation

Fatty acid compound 1: Struktol EF-44 produced by Schill+Seilacher Struktol AG [(i) zinc salt of aliphatic carboxylic acid: zinc salt of fatty acid ($C_{12}$ to $C_{18}$) derived from naturally occurring vegetable oil, (ii) fatty acid ($C_{12}$ to $C_{18}$) derived from naturally occurring vegetable oil, (iii) zinc salt of aromatic carboxylic acid: zinc benzoate, (iv) aromatic carboxylic acid: benzoic acid, content molar ratio: 1:1:1:1, zinc content: 8% by mass]

Fatty acid compound 2: Activator 73A produced by Schill+Seilacher Struktol AG [(i) zinc salt of aliphatic carboxylic acid: zinc salt of fatty acid ($C_8$ to $C_{12}$) derived from coconut oil, (ii) zinc salt of aromatic carboxylic acid: zinc benzoate, content molar ratio: 1/1, zinc content: 17% by mass]

Zinc oxide: Zinc oxide #2 produced by Mitsui Mining & Smelting Co., Ltd.

Antiaging agent: NOCRAC 6C (N-(1,3-dimethylbutyl)-N'-phenyl-p-phenylenediamine) produced by OUCHI SHINKO CHEMICAL INDUSTRIAL CO., LTD.

Wax: OZOACE wax produced by Nippon Seiro Co., Ltd.

Sulfur: Sulfur powder produced by Tsurumi Chemical Industry Co., Ltd.

Vulcanization accelerator BBS: NOCCELER NS (N-tert-buthyl-2-benzothiazolylsulfenamide) produced by OUCHI SHINKO CHEMICAL INDUSTRIAL Co., LTD.

Examples 1 to 13 and Comparative Examples 1 to 5

A Banbury mixer was charged with the chemical agents in amounts shown in Process 1 in Table 1 and they were mixed and kneaded for five minutes so as to raise the outlet temperature to about 150° C. Thereafter, the sulfur and the vulcanization accelerator in amounts shown in Process 2 were added to the mixture obtained by Process 1, and they were mixed and kneaded for three minutes at about 80° C. by an open roll mill. Thereby, an unvulcanized rubber composition was obtained. This unvulcanized rubber composition was formed into a tread shape, laminated with other tire components, and then vulcanized for 15 minutes at 170° C., whereby studless tires in the respective Examples and Comparative Examples were produced.

The respective samples were evaluated by the following methods.

(Reversion)

Using a curelastometer, a vulcanization curve of the unvulcanized rubber composition at 170° C. was determined. The maximum torque rise (MH-ML) was regarded as 100, and a torque rise obtained 15 minutes after the start of vulcanization was expressed as a relative value. Then, a value obtained by subtracting the relative value from 100 was regarded as a reversion ratio. A lower reversion ratio shows that the reversion is more suppressed and better reversion resistance is achieved.

(Viscosity/Processability)

With regard to the viscosity, Mooney viscosity ($ML_{1+4}$/130° C.) of the unvulcanized rubber composition was determined based on JIS K 6300-1 "Rubber, unvulcanized—Physical Property—Part 1: Determination of Mooney viscosity and pre-vulcanization characteristics with Mooney viscometer". That is, a Mooney viscosity tester was preheated for one minute up to 130° C. and a large rotor was rotated under this temperature condition. After four minutes of rotation, the Mooney viscosity was determined. Here, the value was rounded to the nearest whole number.

With regard to the processability, a Mooney viscosity value of 35 or more is evaluated as "+++", that of 32 or more and less than 35 is evaluated as "++", that of 30 or more and less than 32 is evaluated as "+", and that less than 30 is evaluated as "−".

(Hardness)

In accordance with JIS K 6253 "Rubber, vulcanized or thermoplastic—Determination of hardness", the hardness of vulcanized rubber samples in the respective Examples and Comparative Examples was determined by a type A durometer.

(Performance on Ice and Snow)

Using the studless tires of the respective Examples and Comparative Examples, actual vehicle performance on ice and snow was evaluated under the following conditions. Here, studless tires for a passenger vehicle, which have a size of 195/65 R15 and a DS-2 pattern, were produced and the tires were mounted on a 2000 cc FR car made in Japan. The test was run on the test course of Sumitomo Rubber Industries, Ltd. in Nayoro, Hokkaido, Japan. The temperature on ice was from −6 to −1° C. and the temperature on snow was from −10 to −2° C.

Handling performance (evaluation of feeling): Starting, accelerating and stopping of the above car were evaluated by a test driver's feelings. In the evaluation, Comparative Example 1 was regarded as the standard, which was graded 100. Then, grading was performed in such a manner that the tires were graded 120 if the test driver judged that their performance was obviously improved, and the tires were graded 140 if the test driver judged that they were at a high level never seen before.

Braking performance (brake stopping distance on ice): The stopping distance on ice, which is the distance required for the car to stop after stepping on brakes that lock up at 30 km/h, was measured. Then, Comparative Example 1 was taken as a reference and the performance was calculated from the following equation:

(Braking performance index)=(Brake stopping distance in Comparative Example 1)/(Stopping distance)×100.

(Abrasion Resistance)

The tires with a size of 195/65 R15 were mounted on a FF car made in Japan, and the depth of grooves on the tire tread part was measured after the car had run 8000 km. The running distance that makes the depth of the tire grooves decrease by 1 mm was calculated, and the abrasion resistance was expressed with an index calculated from the following equation:

(Abrasion resistance index)=(Running distance at which groove depth is decreased by 1 mm)/(Running distance at which tire groove depth in Comparative Example 1 is decreased by 1 mm)×100.

A larger index shows better abrasion resistance.

Table 1 shows evaluation results of the respective tests.

TABLE 1

| | | | Examples | | | | | | | | |
|---|---|---|---|---|---|---|---|---|---|---|---|
| | | | 1 | 2 | 3 | 4 | 5 | 6 | 7 | 8 | 9 |
| Amount (parts by mass) | Process 1 | NR | 60 | 60 | 60 | 60 | 60 | 60 | 60 | 60 | 60 |
| | | BR 1 | 40 | 40 | 40 | 40 | 40 | 40 | 40 | 40 | 30 |
| | | BR 2 | | | | | | | | | |
| | | BR 3 | | | | | | | | | |
| | | BR 4 | | | | | | | | | |
| | | Carbon black 1 | 47 | 43 | 35 | 35 | 47 | 43 | 43 | 43 | 50 |
| | | Carbon black 2 | 3 | 7 | 15 | | 3 | 3 | 3 | 3 | |
| | | Carbon black 3 | | | | 15 | | | | | |
| | | Calcium carbonate | | | | | | | | | 5 |
| | | Mineral oil | 25 | 25 | 25 | 25 | 25 | 25 | 25 | 25 | 25 |
| | | Stearic acid | 3 | 3 | 3 | 3 | 4 | 2.5 | 2.5 | 2 | 3 |
| | | Fatty acid compound 1 | | | | | | | 1 | | |
| | | Fatty acid compound 2 | | | | | | | | 3 | |
| | | Zinc oxide | 3 | 3 | 3 | 3 | 3 | 3 | 3 | 3 | 3 |
| | | Antiaging agent | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 |
| | Process 2 | Sulfer | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 |

TABLE 1-continued

| | | | | | | | | | | |
|---|---|---|---|---|---|---|---|---|---|---|
| Evaluation | Reversion ratio | 6 | 6 | 6 | 6 | 5 | 9 | 3 | 1 | 7 |
| | Viscosity | 32 | 33 | 35 | 32 | 31 | 32 | 30 | 33 | 32 |
| | Processability | ++ | ++ | +++ | ++ | + | ++ | + | ++ | ++ |
| | Hardness | 46 | 47 | 48 | 47 | 47 | 45 | 46 | 48 | 47 |
| | Handling performance (on snow) | 125 | 125 | 120 | 120 | 130 | 115 | 125 | 130 | 125 |
| | Braking performance | 105 | 103 | 102 | 102 | 110 | 115 | 113 | 110 | 108 |
| | Abrasion resistance | 105 | 110 | 115 | 107 | 109 | 103 | 107 | 110 | 98 |

| | | | Examples | | | | Comparative Examples | | | |
|---|---|---|---|---|---|---|---|---|---|---|
| | | | 10 | 11 | 12 | 13 | 1 | 2 | 3 | 4 | 5 |
| Amount (parts by mass) | Process 1 | NR | 40 | 40 | 40 | 40 | 60 | 60 | 60 | 40 | 40 |
| | | BR 1 | 60 | 50 | 50 | 30 | 40 | 40 | 40 | 60 | 20 |
| | | BR 2 | | 10 | | | | | | | 40 |
| | | BR 3 | | | 10 | | | | | | |
| | | BR 4 | | | | 30 | | | | | |
| | | Carbon black 1 | 47 | 50 | 50 | 50 | 50 | 50 | 20 | 50 | 50 |
| | | Carbon black 2 | 3 | | | | | | 30 | | |
| | | Carbon black 3 | | | | | | | | | |
| | | Calcium carbonate | | | | | | | | | |
| | | Mineral oil | 25 | 25 | 25 | 25 | 25 | 25 | 25 | 25 | 25 |
| | | Stearic acid | 3 | 3 | 3 | 3 | 1 | 2 | 3 | 2 | 3 |
| | | Fatty acid compound 1 | | | | | | | | | |
| | | Fatty acid compound 2 | | | | | | | | | |
| | | Zinc oxide | 3 | 3 | 3 | 3 | 3 | 3 | 3 | 3 | 3 |
| | | Antiaging agent | 1.5 | 1.5 | 1.5 | 1.5 | 1.5 | 1.5 | 1.5 | 1.5 | 1.5 |
| | | Wax | 1 | 1 | 1 | 1 | 1 | 1 | 1 | 1 | 1 |
| | Process 2 | Sulfer | 1.5 | 1.5 | 1.5 | 1.5 | 1.5 | 1.5 | 1.5 | 1.5 | 1.5 |
| | | Vulcanization accelerator BBS | 1.0 | 1.0 | 1.0 | 1.0 | 1.0 | 1.0 | 1.0 | 1.0 | 1.0 |
| Evaluation | Reversion ratio | | 5 | 4 | 4 | 4 | 20 | 13 | 7 | 12 | 3 |
| | Viscosity | | 32 | 31 | 35 | 32 | 33 | 28 | 37 | 28 | 38 |
| | Processability | | ++ | + | +++ | ++ | ++ | − | +++ | − | +++ |
| | Hardness | | 45 | 47 | 50 | 46 | 45 | 45 | 51 | 44 | 51 |
| | Handling performance (on snow) | | 130 | 130 | 125 | 125 | 100 | 105 | 107 | 106 | 98 |
| | Braking performance | | 110 | 106 | 103 | 109 | 100 | 102 | 90 | 107 | 100 |
| | Abrasion resistance | | 103 | 110 | 112 | 120 | 100 | 100 | 115 | 97 | 98 |

Every Example showed a low reversion ratio and appropriate hardness, and achieved both high handling performance and high braking performance on ice.

Further, Examples 1 to 8, containing a carbon black with an average particle size of 22 nm or less and/or a DBP oil absorption of 120 ml or more per 100 g, showed appropriate viscosity without a problem such as hyperviscosity, and also showed good processability and good abrasion resistance.

In Example 9 in which calcium carbonate was blended, although the abrasion resistance slightly decreased, the viscosity was appropriate without a problem such as hyperviscosity and good processability was achieved.

Furthermore, in Examples 11 to 13, adequate viscosity and good processability were achieved by blending the SPB-containing BR or the butadiene rubber having a cis content of 95% or more and a viscosity of a 5% solution in toluene of 80 cps or more at 25° C. Due to a high BR ratio, good handling performance and good braking performance were also achieved despite slightly high hardness, and good abrasion resistance was achieved even under a high BR-ratio condition.

On the other hand, Comparative Examples, having a small additive amount of a fatty acid or having high hardness of the tread, showed poorer reversion resistance, handling performance and braking performance on ice.

INDUSTRIAL APPLICABILITY

According to the present invention, it is possible to provide a high performance studless tire, which has both good braking force and high handling stability on ice or snow because the tire comprises a tread made of a rubber composition that contains 2.2 to 10 parts by mass of a fatty acid and/or a derivative of the fatty acid per 100 parts by mass of a rubber component and, the tread having a JIS-A hardness of 50 or less. Further, it is possible to provide the studless tire at higher productivity and at a lower price for customers.

The invention claimed is:

1. A studless tire for a passenger vehicle comprising:
a tread made of a rubber composition that contains 2.2 to 10 parts by mass of a fatty acid and/or a zinc salt, calcium salt or magnesium salt of the fatty acid, 0.5 to 25 parts by mass of a carbon black with an average particle size of 22 nm or less and/or a DBP oil absorption of 120 ml or more per 100 g, and 5 parts by mass or more of an oil or a plasticizer per 100 parts by mass of a rubber component, the tread having a JIS-A hardness of 50 or less.

2. The studless tire for a passenger vehicle according to claim 1, wherein the rubber component comprises a butadiene rubber in which syndiotactic-1,2-polybutadiene is dispersed.

3. The studless tire for a passenger vehicle according to claim 1, wherein the rubber component comprises a butadiene rubber that has a cis content of 95% or more and has a viscosity in a 5% solution of toluene of 80 cps or more at 25° C.

4. The studless tire for a passenger vehicle according to claim 1, wherein the rubber composition further contains 1 to 10 parts by mass of calcium carbonate per 100 parts by mass of the rubber component.

5. The studless tire for a passenger vehicle according to claim 1, wherein the content of the carbon black with an average particle size of 22 nm or less and/or a DBP oil absorption of 120 ml or more per 100 g is 0.5 to 15 parts by mass, and the content of the oil or the plasticizer is 5 to 60 parts by mass, per 100 parts by mass of the rubber component.

6. The studless tire for passenger vehicle according to claim 1, wherein the rubber component comprises natural rubber and/or epoxidized natural rubber, and butadiene rubber.

7. The studless tire for passenger vehicle according to claim 1,
   wherein the fatty acid and/or the zinc salt, calcium salt or magnesium salt of the fatty acid is at least one member selected form the group consisting of aliphatic carboxylic acids derived from vegetable oils, aliphatic carboxylic acids derived from animal oils, aliphatic carboxylic acids chemically synthesized, and the zinc salt, calcium salt or magnesium salts thereof.

8. The studless tire for passenger vehicle according to claim 1,
   wherein the total content of carbon blacks is 15 parts by mass or more and 80 parts by mass or less.

* * * * *